United States Patent [19]

Minami et al.

[11] Patent Number: 5,450,333

[45] Date of Patent: Sep. 12, 1995

[54] CUTTING MACHINE AND WORKPIECE PICK-UP METHOD FOR THE SAME

[75] Inventors: Toshiyuki Minami; Hideyuki Ohkubo; Hitoshi Matsumoto, all of Nagoya, Japan

[73] Assignee: Mitsubishi Denki Kabushiki Kaisha, Tokyo, Japan

[21] Appl. No.: 213,591

[22] Filed: Mar. 16, 1994

[30] Foreign Application Priority Data

Mar. 17, 1993 [JP] Japan ................... 5-056894

[51] Int. Cl.⁶ .............................................. G06F 19/00
[52] U.S. Cl. ................... 364/474.09; 83/76.8; 83/100
[58] Field of Search ............... 364/474.09, 474.13, 364/470, 469; 83/61, 69, 73, 74, 76.7, 76.8, 79, 80, 100, 151, 152, 177, 365, 366, 373, 936–941, 298, 358

[56] References Cited

U.S. PATENT DOCUMENTS

| | | | |
|---|---|---|---|
| 3,761,675 | 9/1973 | Mason et al. | 364/474.09 |
| 4,773,293 | 9/1988 | Mizuta et al. | 83/40 X |
| 4,793,033 | 12/1988 | Schneider et al. | 83/100 X |
| 4,961,149 | 10/1990 | Schneider et al. | 364/474.09 X |
| 5,172,326 | 12/1992 | Campbell, Jr. et al. | 364/474.09 X |

FOREIGN PATENT DOCUMENTS 3260164 11/1991 Japan .

*Primary Examiner*—Joseph Ruggiero
*Attorney, Agent, or Firm*—Sughrue, Mion, Zinn, Macpeak & Seas; Richard C. Turner; John J. Penny

[57] ABSTRACT

A cutting machine for cutting a workpiece is disclosed, which comprises a feed conveyor for feeding the workpiece, a position matching unit for effecting position matching of the workpiece fed on the feed conveyor, position matching correcting unit for checking and calculating the deviation of the workpiece, cutting means for cutting the workpiece fed on the feed conveyer according to the deviation calculated by the position matching correcting unit, a pick-up unit for picking up cut parts from the cutting means by a suction system, a discharging conveyor for feeding parts picked up by the pick-up unit, and interlock control means for interlock controlling the individual components.

20 Claims, 11 Drawing Sheets

(a) PICK-UP UNIT SUCTION SURFACE

● : SUCTION HOLE
○ : SENSOR (b) SECTION OF PICK-UP UNIT SUCTION

• : SUCTION VALVE "OFF", SUCTION "OFF"
⊙ : SUCTION VALVE "ON", SUCTION "ON"

CUTTING MACHINE AND WORKPIECE PICK-UP METHOD FOR THE SAME

FIELD OF THE INVENTION

This invention relates to a cutting machine for executing a cutting process on a workpiece with laser, knife, etc. and also a workpiece pick-up method for such cutting machine. More particularly, the invention relates to a cutting machine for fabric material and the like, which can interlock such functions as feeding of a workpiece, position matching, cutting, pick-up, workpiece discharging and discharging of cutting remains, and permits parts after the cutting process to be picked up efficiently and with high accuracy.

BACKGROUND OF THE INVENTION

FIG. 10 is a perspective view showing a conventional cutting machine disclosed in Japanese Utility Model Publication NO. 33297/90. Referring to the Figure, designated at 200 is the cutting machine as a whole, at 201 a laser, at 202 a laser beam output therefrom, at 203 a laser beam scanner for reflecting the laser beam 202 from the laser 201 such as to scan a desired position of a feed conveyer 205 confined in a machining chamber 204 with the reflected laser beam 202, at 206a, 206b two ITV cameras for taking pattern images, at 207 a monitor for displaying images taken by the ITV cameras 206a and 206b, at 208 a digitizer for moving a cursor on the monitor 207, at 209 a position matching controller for controlling the image input and the digitizer 208, and at 210 a cutting machine controller for controlling the cutting machine 200. The position matching controller corrects cutting data, the corrected cutting data being input to the cutting machine controller 210. Designated at 211 is an illumination unit for making clear the images of workpiece taken by the ITV cameras 206a and 206b, The position matching controller 209 controls the ITV cameras 206a and 206b and digitizer 208. The ITV cameras 206a and 206b, digitizer 208 and monitor 207 are connected to the position matching controller 209. When position matching is done by the operator, the position matching controller 209 produces correction data according to the position matching operation and outputs the correction data to the cutting machine controller 210. The cutting machine controller controls the laser 201 and the laser beam scanner 203 for the execution of cutting of workpiece according to cutting data produced with a CAD or the like and corrected cutting data obtained after correction by the correction data noted above.

The operation of the cutting machine 200 will now be described with reference to FIG. 11. As shown, the top of the feed conveyer 205 is divided into a "developed piece position matching region", a "cutting region" and a "take-out region", the "cutting region" being located in the process chamber 204. The ITV cameras 206a and 206b are disposed above the "developed piece pattern matching region". The workpiece 212 is fed on the feed conveyor 205 in the direction of arrow past the "developed piece pattern matching region", "cutting region" and "take-out region".

The workpiece 212 is set on the feed conveyer 205 at a predetermined position thereof in the "developed piece pattern matching region" before being fed to the "cutting region". Beneath the ITV cameras 206a and 206b, a predetermined range of the workpiece 212 is photographed with the ITV camera 206a by holding the feed conveyer 205 for a while. The image of the workpiece range thus obtained is displayed on the monitor 207.

At the same time, a cursor indicating a predetermined position matching reference position on the monitor screen is also displayed. This cursor is displayed according to the cutting data, and normally it is displayed at the center of the screen of the monitor 207. The operator moves the cursor on the screen of the monitor 207 to the position matching position of the workpiece 212 by operating the cursor switch in the digitizer 208. According to the movement of the displayed cursor, the position matching controller 209 calculates "first correction data" to be stored in a memory.

Then, the input to the monitor 207 is switched, and a predetermined range of the workpiece 212 is photographed with the other ITV camera 206b. The image of the range thus obtained is displayed on the monitor 207. Then, "second correction data" is calculated and stored in the memory in the manner as noted above.

The position matching controller 209 corrects the cutting data given by the CAD or the like according to the "first correction data" and "second correction data". The correction is effected with parallel movement, rotation or a combination of these motions. When the position matching operation is completed, the workpiece 212 is moved on the feed conveyer 205 into the process chamber 204. Then, cutting is executed according to the corrected cutting data. The workpiece 212 after the cutting is fed on the feed conveyer 205 to the "take-out region". The position matching and cutting are executed by repeating like operations.

As for a part pick-up technique related to this type of the cutting machine, there is one in which parts are picked up with gripping means. In this gripping type parts pick-up system, a plurality of gripping mechanisms are controlled by determining gripping conditions from the size of parts and positional relation thereof to the gripping mechanisms. In the pick-up operation, the feed conveyer is stopped a plurality of times to effect the pick-up of parts.

As other reference literatures pertaining to the present invention, there are "Next Step Feed System in Clothing Sewing Process and Apparatus for the Same" disclosed in Japanese Patent Laid-Open No. 49991/92, "Automatic Cutting Apparatus" disclosed in Japanese Patent Laid-Open No. 281079/91, "Pattern Matching Cutting Apparatus" disclosed in Japanese Patent Laid-Open No. 24278/92, "Method and Apparatus for Pattern Matching Base Material" disclosed in Japanese Patent Laid-Open No. 240261/92, "Cutting Table Protection Sheet for Automatic Cutting Machine" disclosed in Japanese Utility Model Laid-Open NO. 33597/89, "Workpiece Pick-Up device" disclosed in Japanese Patent Laid-Open No. 108489/92, and "Workpiece Feeding Device of Cutting Apparatus" disclosed in Japanese Patent Laid-Open No. 178320/86.

In the conventional cutting machine described above, the feeding of workpiece, pick-up of parts and removal of cutting remains were all done manually. In addition, since the gripping system was adopted as the parts pick-up means, it was necessary to stop the feed conveyer a plurality of times in an interlocked relation to the pick-up process. Therefore, the production efficiency was inferior. Further, with the conventional gripping system, a deviation of the workpiece is generated on the feed path, thus disabling accurate pick-up of parts and hence disabling accurate cutting process.

SUMMARY OF THE INVENTION

It is an object of providing a cutting machine, which permits an automatic operation and also adopts pick-up means of a suction system to alleviate the operator's burden, improve the production efficiency and permit accurate pick-up process for realizing high accuracy cutting process, and also a workpiece pick-up method for the same cutting machine.

According to the invention, there is provided a cutting machine for cutting a workpiece, which comprises a feeding means for feeding the workpiece, position matching means for effecting position matching of the workpiece fed feeding means, position matching correcting means for checking positional deviation of the workpiece and calculating deviation amount, cutting means for cutting a workpiece fed by the feeding means according to deviation calculated by the position matching correcting means, pick-up means for picking up cut parts from the cutting means by a suction system., discharging means for feeding parts picked up by the pick-up means, and interlock control means for interlock controlling the individual means.

The pick-up means includes a plurality of suction holes, suction valves each controlling each of the suction holes independently, and sensing means for sensing parts being picked up in synchronism to suction valve on-off operation.

The suction valves are controlled according to valve control data generated according to cutting data.

When a workpiece pick-up fault is detected by the sensing means, the pick-up means executes a pick-up after controlling the suction force of the suction valves corresponding to the site of the pick-up fault.

The pick-up means further includes lift means movable in perpendicular directions with respect to the feeding means, slide means movable horizontally relative to the feeding means, and feed control means for feeding picked-up parts to the discharging means by controlling the lift means and the slide means.

According to the invention, there is also provided a workpiece pick-up method for the cutting machine, which comprises the steps of reading workpiece cutting data, counting parts from the cutting data, generating valve control data from the parts count, calculating circumscribing shapes of workpiece parts, determining suction hole candidates for suction according to calculated circumscribing shapes, and determining suction holes by executing an inclusion check.

In the cutting machine according to the invention, position matching of a workpiece being fed is effected, and then the deviation of the workpiece from the set position is checked, and its amount is calculated. Then, the workpiece having been fed is cut according to the calculated deviation. The cut parts are picked up by the suction system and discharged. The above individual operations are executed automatically in an interlocked relation.

The pick-up means has its plurality of suction holes controlled independently by the suction valves, and whether parts are to be sucked is checked when picking up the parts in synchronism to suction valve on-off operation. The suction valves are controlled according to valve control data generated according to cutting data. When workpiece pick-up fault is detected, the pick-up means executes a pick-up again by increasing the suction force of the suction valves corresponding to the side of a detection of the workpiece pick-up fault. The pick-up means is moved in vertical and horizontal directions with respect to the feeding means to feed the picked-up parts to the discharging unit with its vertical and horizontal movements.

In the workpiece pick-up method for the cutting machine according to the invention, workpiece cutting data is read out, parts are counted from the cutting data, valve control data is generated from the parts count, circumscribing shapes of workpiece parts are calculated, suction hole candidates for suction are determined according to the calculated circumscribing shapes, and suction holes are determined according to an inclusion check.

As has been described in the foregoing, with the cutting machine and the workpiece pick-up method for the same according to the invention, the functions of workpiece supply, position matching, cutting, pick-up, discharging and cutting remains removal are interlock controlled to permit automatic operation. Thus, it is possible to alleviate the operator's burden, realize energy saving and improve the production efficiency. Further, according to the invention, deviation of the workpiece is detected, and the cutting and pick-up operations are interlocked to each other according to the determined deviation amount, thus permitting realization of highly accurate cutting and pick-up without reducing productivity.

Other objects and features of this invention will become understood from the following description with reference to the accompanying drawings.

DESCRIPTION OF THE PREFERRED EMBODIMENT

Figure 1:
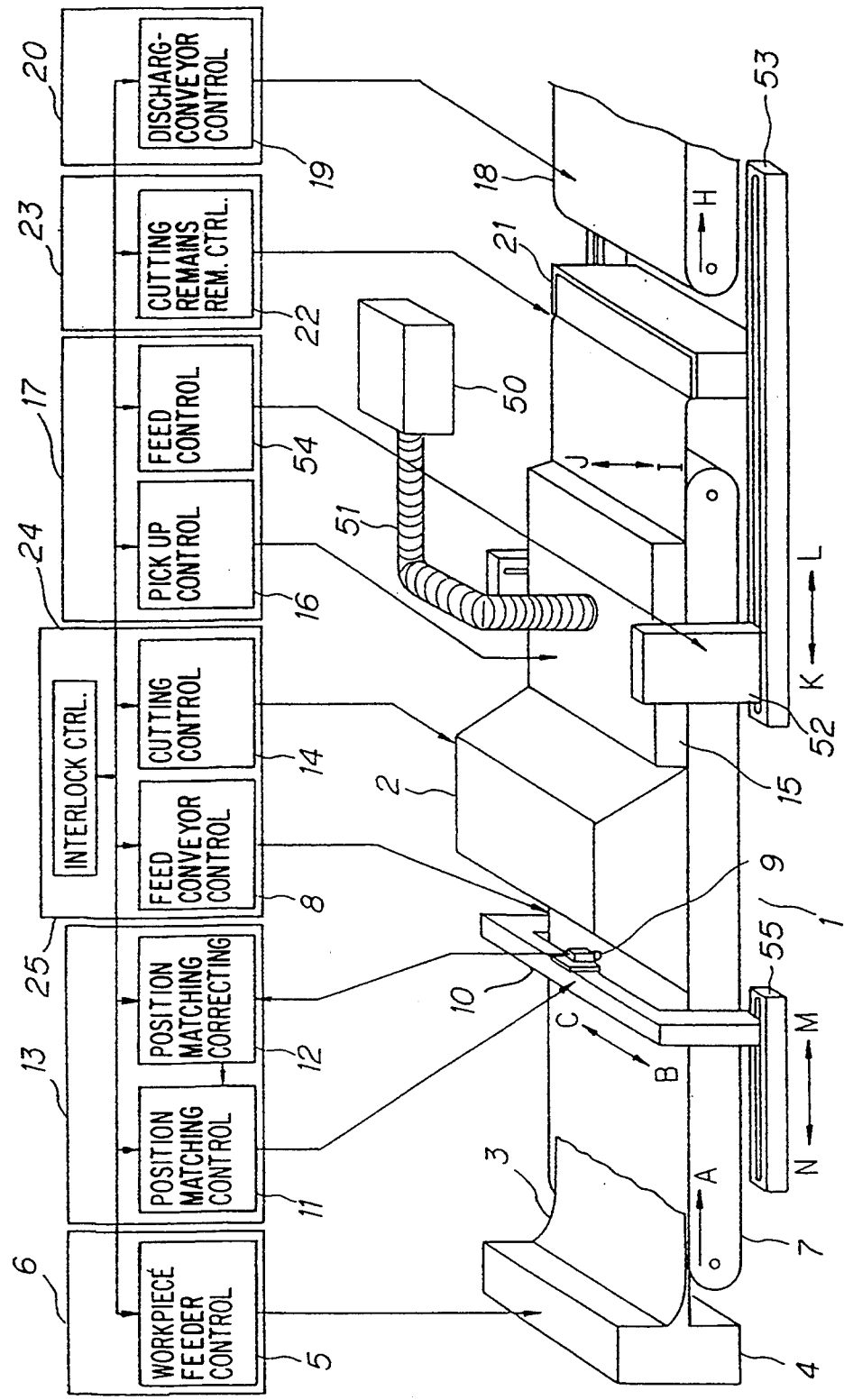
FIG. 1 is a view schematically showing a cutting machine according to the invention.

FIG. 1 is a view schematically showing a cutting machine according to the invention. Referring to the Figure, designated at 1 is the machine as a whole, at 2 a process chamber for executing a cutting process, at 3 the workpiece, at 4 a workpiece feeder for feeding the workpiece 3, at 5 a workpiece feeder control section for controlling the workpiece feeder 4, at 6 a workpiece feeder controller including the workpiece feeder control section 5, at 7 a feed conveyer for feeding the workpiece 3 in the direction of arrow A, at 8 a feed conveyer control section for controlling the feed conveyer 7, at 9 an ITV camera, at 10 a position matching unit for moving the ITV camera in the directions of arrows B and C to desired positions with respect to the workpiece 3 fed on the feed conveyer 7, and at 11 position matching control section for controlling the position matching unit 10.

Designated at 12 is a correcting section for checking a deviation of the workpiece 3 from the set position and calculating the amount of the deviation. At 13 is a position matching unit controller including the position matching control section 11 and position matching correcting section 12. At 14 is a cutting control section for controlling the position of laser beam irradiation in the process chamber 2 with respect to the workpiece 3 having been fed on the feed conveyer 7 according to the correction amount calculated by the position matching correcting section 12. At 15 is a pick-up unit for picking up parts obtained after cutting, at 16 is a pick-up control section for controlling the pick-up unit 15, and at 17 is a pick-up unit controller including the pick-up control section 16 and feed control section 54.

Designated at 50 is a suction unit for supplying suction force to the pick-up unit 15. At 51 is a suction duct connecting the suction unit 50 and the pick-up unit 15. At 52 is a lift mechanism for moving the pick-up unit 15 in vertical directions (as shown by arrows I and J) with respect to the feed conveyer 7. At 53 is a slide mechanism for moving the pick-up unit 15 in horizontal directions (as shown by arrows K and L) with respect to the feed conveyer 7, and at 54 is a feed control section provided in the pick-up unit controller 17, for controlling the lift mechanism 52 and the slide mechanism 53.

Designated at 18 is a discharging conveyer for feeding parts picked up by the pick-up unit 15 in the direction of arrow H. At 19 is a discharging conveyer control section for controlling the discharging conveyer 18. At 20 is a discharging conveyer controller including the discharging conveyer control section 19. At 21 is a cutting remains removing unit for removing cutting remains remaining on the feed conveyer 7 without being picked up by the pick-up unit 15. At 23 is a cutting remains removal control section for controlling the cutting remains removing unit 21. At 24 is an interlock control section for interlock controlling the above individual section, and at 25 is a cutting machine controller including the feed conveyer control section 8, cutting control section 14 and interlock control section 24.

Figure 2:
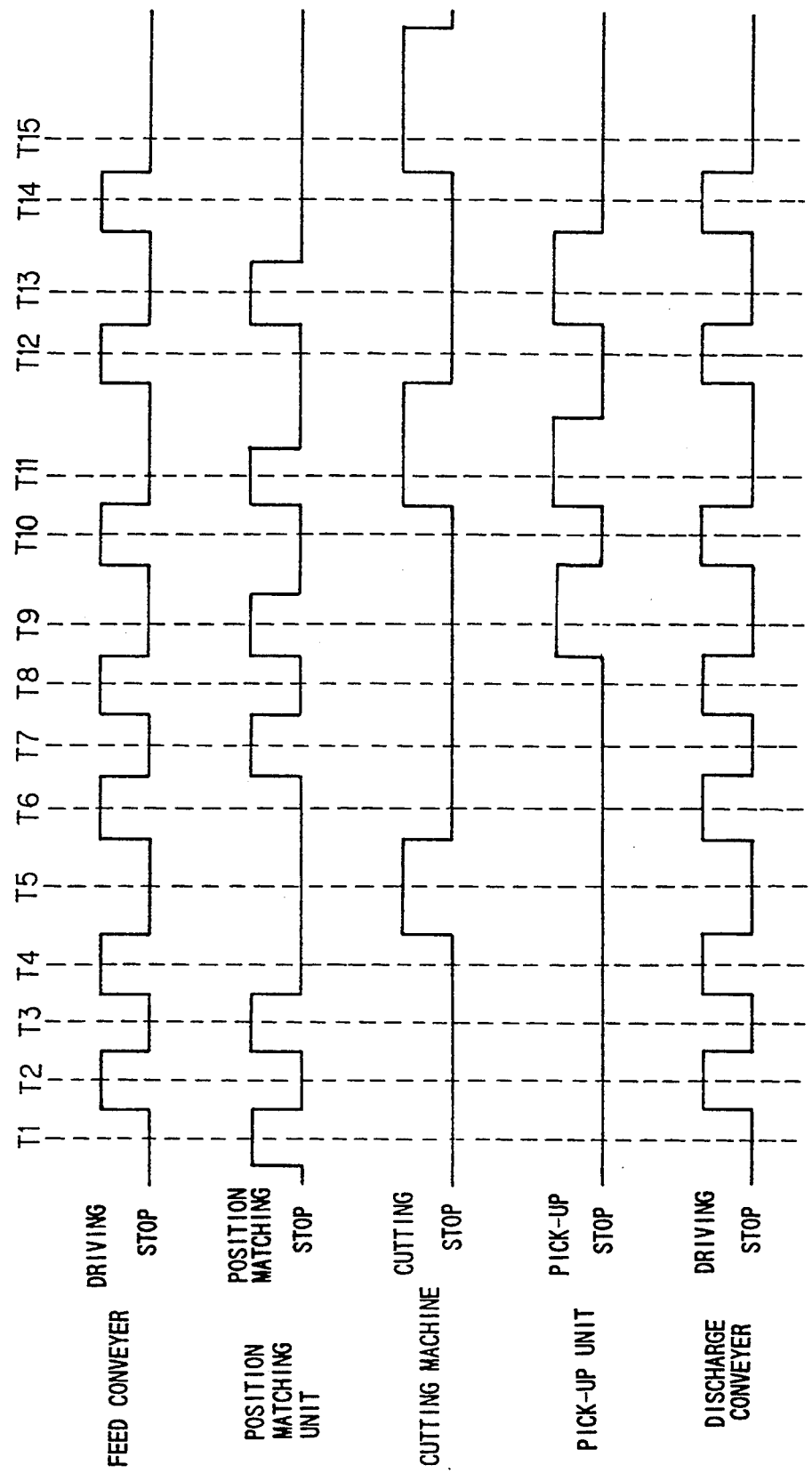
FIG. 2 is a timing chart showing timings of the interlock operation in the cutting machine according to the invention.
Figure 3:
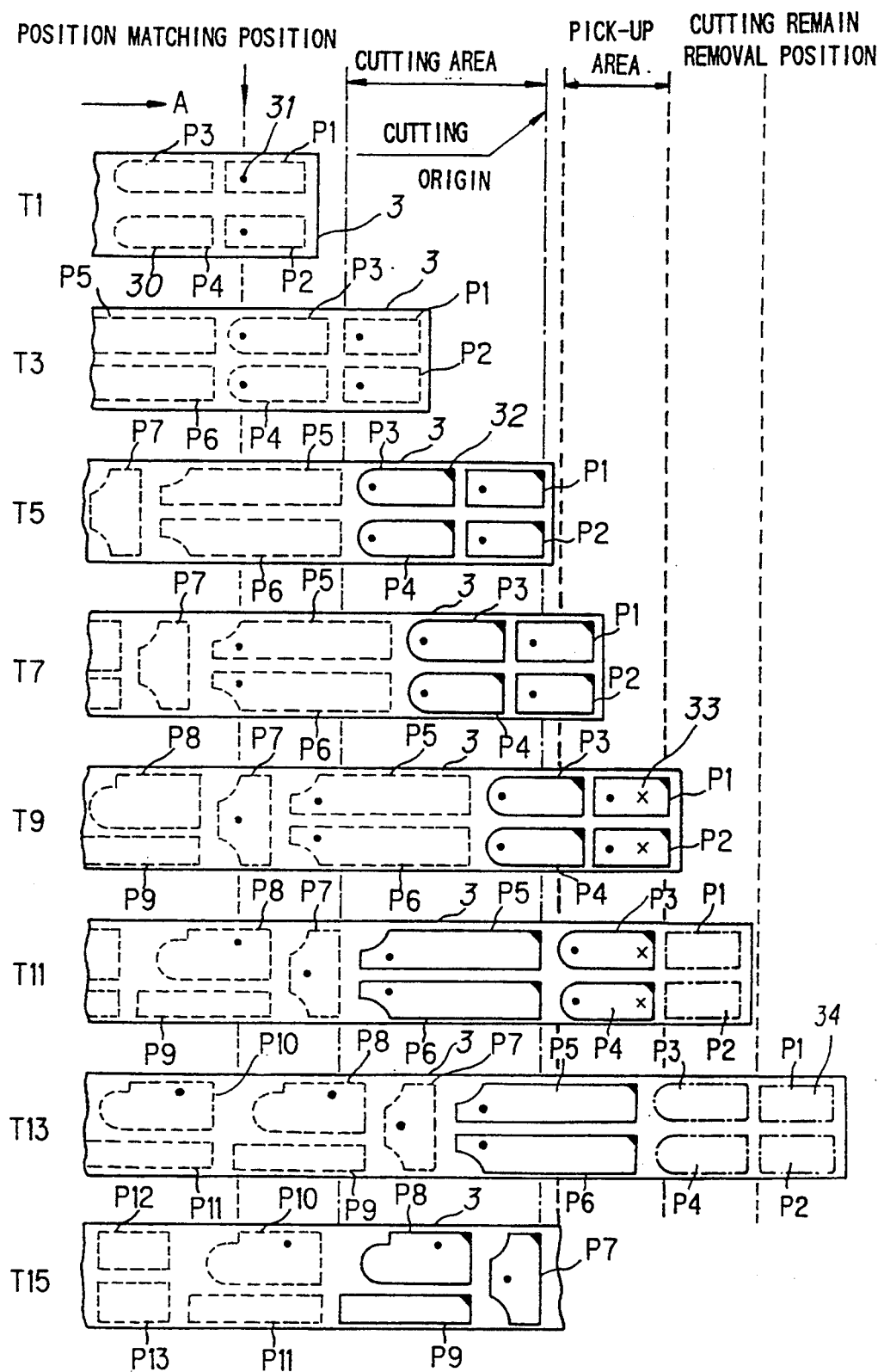
FIG. 3 is a view for explaining an interlock operation in the cutting machine according to the invention.

Now, the operation will be described. FIG. 2 shows timings of various operations performed in the machine and FIG. 3 shows the flow of workpiece 3 in the cutting machine 1. Referring to FIG. 3, labeled P1 to P13 are parts. Designated at 30 the image of a part (shown by dashed lines and requested by data stored in cutting control section 14), which corresponds to cutting data, is projected on the workpiece 3 before cutting. At 31, at a position machining position, are parts (parts with black dots), for which position matching is to be executed. At 32, within a cutting range, are parts (parts with black triangular marks), for which cutting is to be executed, and at 33, at a pick up position, are parts (parts with cross marks), for which pick-up is to be executed. In FIGS. 2 and 3, T1 to T15 indicates the states of the individual units and the workpiece 3 at certain instants of time (FIG. 3 shows only the odd numbered states for clarity since the even numbers are all feed states).

The operation is started by depressing a start switch after setting the workpiece on the feed conveyer 7. The workpiece 3 is fed on the feed conveyer 7 in the direction of arrow A, and is stopped at a position, at which parts P1 and P2 can be position matched. While the workpiece 3 is fed on the feed conveyer in the direction of arrow A, the ITV camera 9 is moved to a position for position matching of the parts P1 and P2. After the feed conveyer 7 is stopped, the position matching correcting section 12 checks the deviation of the parts P1 and P2 from the set position and calculates the correction amount (state T1).

Then, the workpiece 3 is fed on the feed conveyer 7 in the direction of arrow A up to a position, at which the parts P3 and P4 can be position matched (state T2). While the workpiece 3 is fed on the feed conveyer 7 in the direction of arrow A, the ITV camera 9 is moved to the positions for position matching of the parts P3 and P4. After the feed conveyer 7 is stopped, the position matching correcting section 12 checks deviation of the parts P3 and P4 from the set position and calculates the correction amount (state T3). In the state T3, the parts P1 and P2 have not reached the site of cutting, and thus the cutting is not executed in this state.

Then, the workpiece 3 is further fed on the feed conveyer 7 in the direction of arrow A up to a position, at which the parts P1 to P4 can be cut (state T4). After the stopping of the feed conveyer 7, the cutting control section 14 cuts the parts P1 to P4 according to the correction amounts calculated by the position matching correcting section in the states T1 and T2 (state T5). Then, the workpiece 3 is fed on the feed conveyer 7 in the direction of arrow A up to a position at which the parts P5 and P6 can be position matched (state T6). While the workpiece 3 is fed on the feed conveyer 7 in the direction of arrow A, the ITV camera 9 is moved to a position for beginning position matching of the parts P5 and P6. After the stopping of the feed conveyer 7, the position matching correcting section 12 operates the ITV camera and checks the deviation of the parts P5 and P6 and calculates any appropriate correction amount (state T7).

Then, the workpiece 3 is conveyed on the feed conveyer 7 in the direction of arrow A up to a position, at which the parts P1 and P2 can be picked up (state T8). While the workpiece 3 is fed on the feed conveyer 7 in the direction of arrow A, the ITV camera 9 is moved to a position for position matching of the part P7, and also the pick-up unit 15 is moved to the position for picking up the parts P1 and P2. After the stopping of the feed conveyer 7, the position matching correcting section 12 checks deviation of the part P7 and calculates the correction amount. The pick-up control section 16 picks up the parts P1 and P2 according to the correction amount calculated by the position matching correcting section 12 in the state T1, the picked-up parts being transferred to the discharging conveyer 18 (state T9). In the state T9, the position matching and pick-up are executed concurrently.

Then, the workpiece 3 is further fed on the feed conveyer 7 in the direction of arrow A up to a position, at which the part P8 can be position matched, the parts P5 and P6 can be cut and the parts P3 and P4 can be picked up (state T10). While the workpiece 3 is fed on the feed conveyer in the direction of arrow A, the ITV camera 9 is moved to the site of position matching of the part P8, and the pick-up unit 15 is moved to the site of the pick-up of the parts P3 and P4.

The part P9 is one, for which the position matching is not executed. After the stopping of the feed conveyer 7, the position matching correcting section 12 checks deviation of parts P8 and calculates the correction amount. The cutting control section 14 cuts the parts P5 and P6 according to the correction amount calculated by the position matching correcting section 12 in the state T7. The pick-up control section 16 picks up the parts P3 and P4 according to the correction amount calculated by the position matching correction section 12 in the state T3, the picked-up parts being transferred to the discharging conveyer 18 (state T11). In the state T11, the position matching, cutting and pick-up are executed concurrently. Then, the workpiece 3 is fed on the feed conveyer 7 in the direction of arrow A, up to a position at which the parts P10 can be position matched while the parts P5 and P6 can be picked up (state T12).

While the workpiece 3 is fed on the feed conveyer 7 in the direction of arrow A, the ITV camera 9 is moved to the position for position matching of the part P10, and the pick-up unit 15 is moved to the position for picking up the parts P5 and P6. The part 11 also is free from an execution of position matching. After the stopping of the feed conveyer 7, the position matching correcting section 12 checks deviation of the part P10 and calculates the correction amount. The pick-up control section 16 picks up the parts P5 and P6 according to the correction amount calculated by the position matching correcting section 12 in the state T7, the picked-up parts being transferred to the discharging conveyer 18 (state T13). In this state T13, the position matching and pick-up are executed concurrently.

Then the workpiece 3 is fed on the feed conveyer 7 in the direction of arrow A up to a position, at which the parts P7 to P9 can be cut (state T14). After the stopping of the feed conveyer 7, the cutting control section 14 cuts the parts P7 and P8 according to the correction amounts calculated by the position matching correcting section 12 in the states T9 and T11, while cutting the parts P independently of the correction amount (state T15).

As shown above, the position matching, cutting, pick-up and conveyer feed are effected in interlocked operations to one another, thus permitting the individual units to execute processes concurrently. It is thus possible to improve productivity and save power.

Figure 4A:
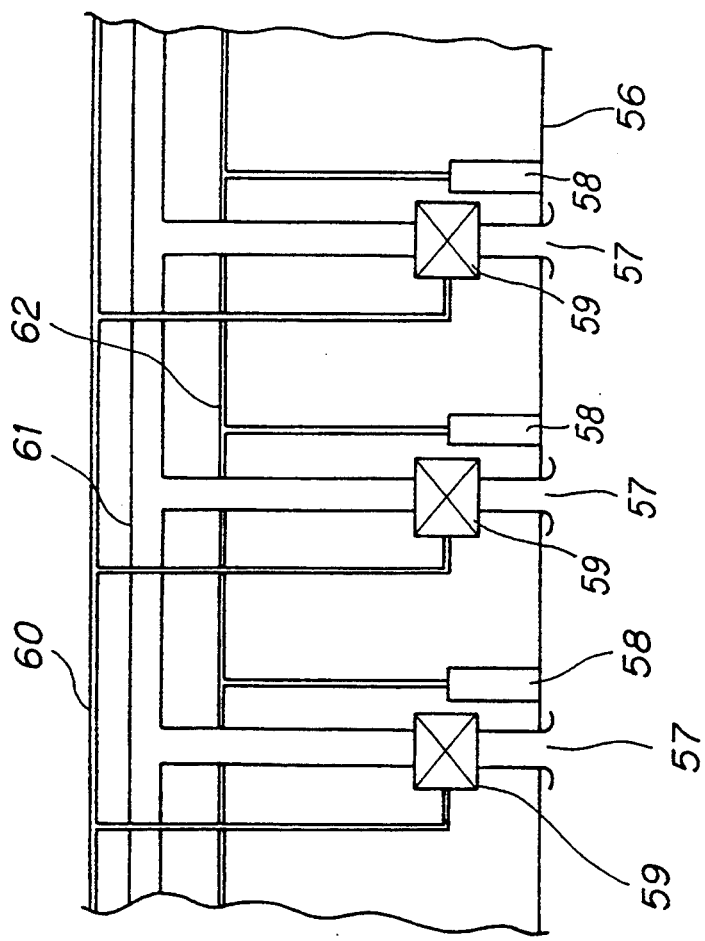
FIGS. 4A and 4B are views schematically showing a pick-up unit in the cutting machine according to the invention.
Figure 4B:
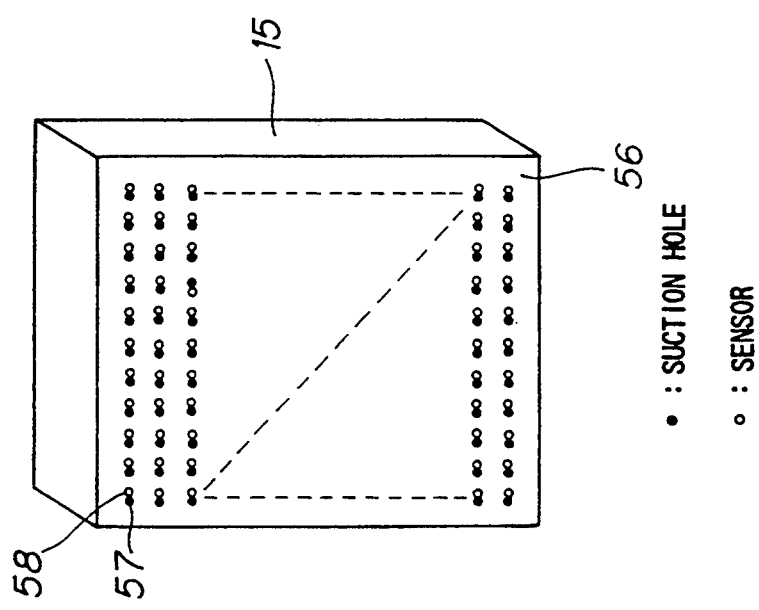

Now, parts pack-up means of the pick-up unit 15 will be described in detail. FIGS. 4A and 4B are views schematically showing the pick-up unit 15. FIG. 4A shows the suction surface of the pick-up unit 15, and FIG. 4B shows a section of the suction section of the pick-up unit 15. Referring to FIG. 4B, designated at 56 is the suction surface, at 57 suction holes, at 58 sensors, at 59 suction valves for on-off switching the suction at the time of the pick-up, at 60 a suction valve control line for executing the on-off control of the suction valves 59 at the time of the pick-up, at 61 a suction line distributed from the suction duct 51 into the pick-up unit 15, and at 62 a sensor control line for controlling the sensors 58. As shown in the Figure, pluralities of suction holes 57, sensors 58 and suction valves 59 are disposed in the pick-up unit 15.

Figure 5:
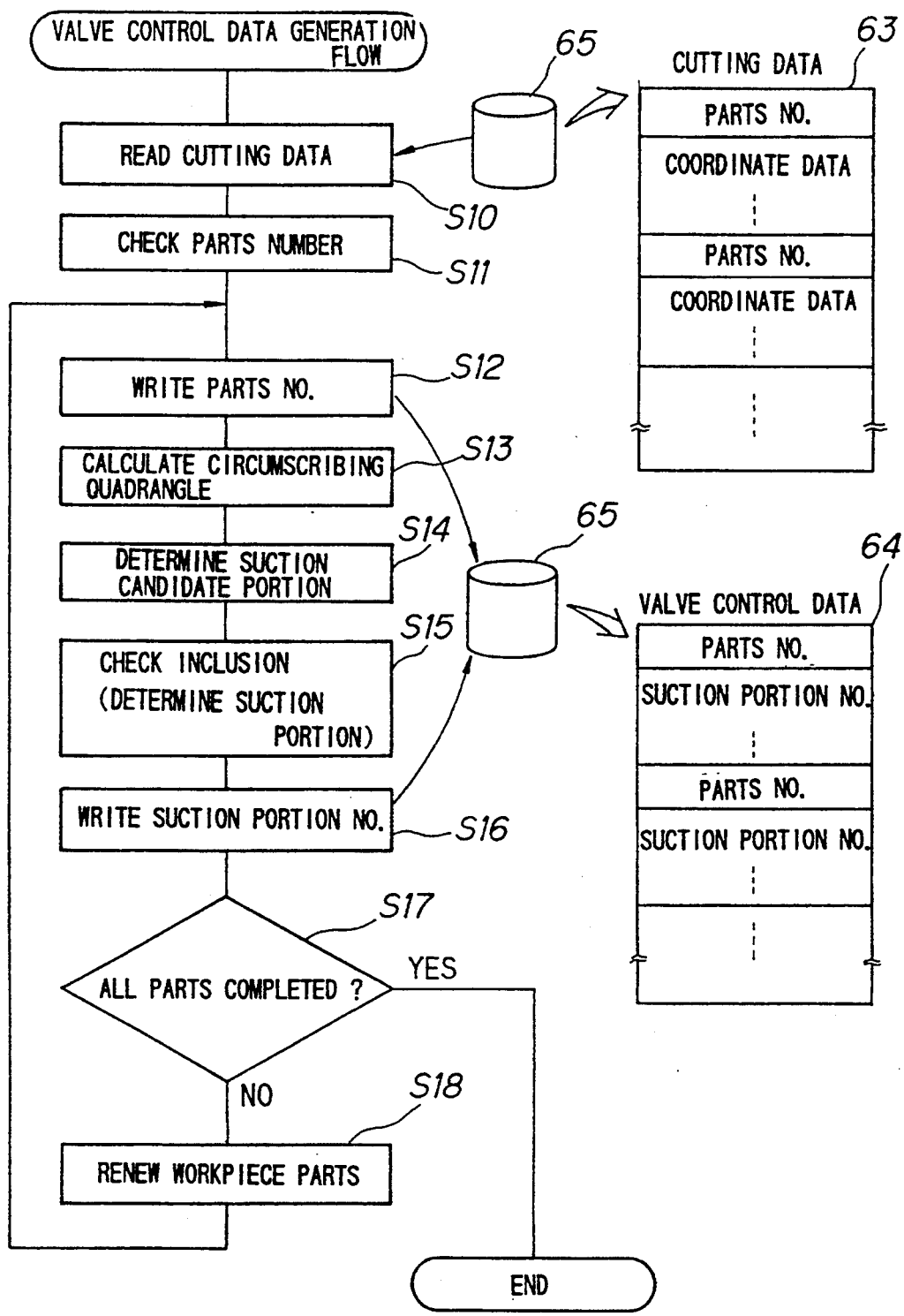
FIG. 5 is a flow chart illustrating the routine of generating valve control data in the cutting machine according to the invention.

FIG. 5 is a flow chart of the procedure of generating valve control data necessary for executing the on-off control of the suction valves 59. In FIG. 5, designated at 63 is cutting data, in which coordinate data of parts necessary for executing the cutting is accommodated, and which serves as a basis of valve control data generation. At 64 is valve control data generated from the cutting data 63, and at 65 is a storage media, in which the cutting and valve control data 63 and 64 are accommodated. Designated at S10 to S18 are process steps.

Figure 6:
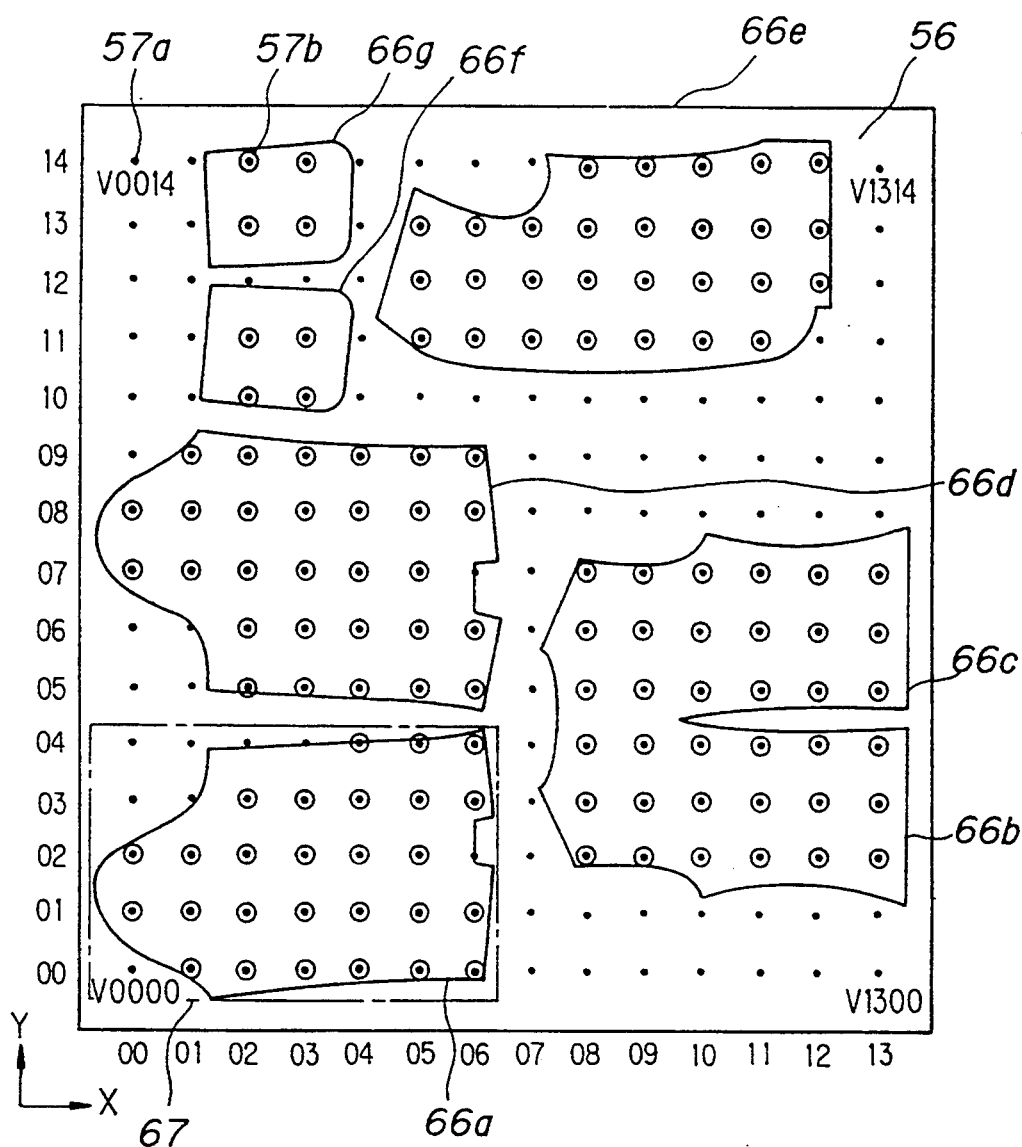
FIG. 6 is a view illustrating the positional relation between the suction means of the cutting machine according to the invention and parts.

FIG. 6 is a view showing the positional relation between the suction section and parts, viewed from the suction surface 56 of the pick-up unit 15. In the Figure, designated at 57a are suction holes not providing suction, at 57b suction holes providing suction, at 66a to 66g cut parts, and at 67 a rectangle circumscribing the parts 66a.

Figure 7:
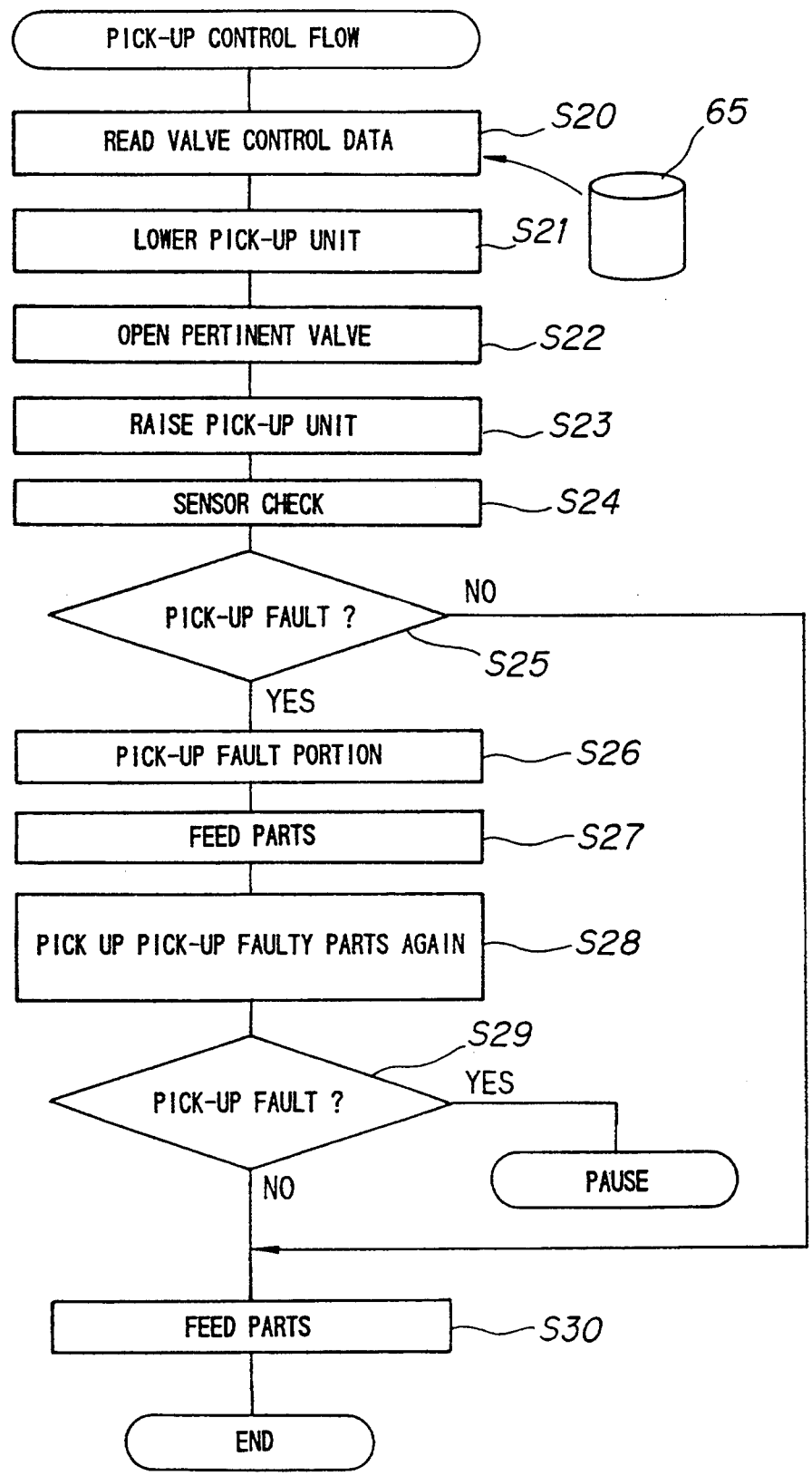
FIG. 7 is a flow chart illustrating a pick-up control operation of the cutting machine according to the invention.

FIG. 7 is a flow chart showing a pick-up control operation when the pick-up unit 15 picks up parts. In the Figure, designated at S20 to S30 are individual steps.

Now, the operation of the pick-up unit 15 will be described. Since the parts pick-up means of the pick-up unit 15 is of the suction system as shown in FIG. 4, the control system for the pick-up control section 16 is different from the conventional gripping system. More specifically, in the conventional gripping system the gripping positions are determined from the positional relation between the size of parts and a plurality of gripping mechanisms, and the individual gripping mechanisms are controlled according to the determined gripping positions for picking up parts. With the suction system according to the invention, the valve control data 64 is generated according to the cutting data 63, and the suction valves 59 are controlled in conformity to the parts shape. The feed control means collectively suck and pick up parts. Thus, if the pick-up unit 15 can cover the same region as the cutting region, it is possible to reduce the number of pauses of the feed conveyer 7 due to the pick-up and permit the functions of the cutting and the pick-up to be obtained concurrently, thus permitting production efficiency improvement.

First, the procedure of generating valve control data 64 necessary for picking up parts, will be described with reference to FIGS. 5 and 6. The cutting data 63 shown in FIG. 5 is constituted by parts No. and coordinate data corresponding to individual parts. The coordinate data are stored in such form as "X100Y100". The valve control data 64 is constituted by parts No. and suction section Nos. corresponding to parts. The suction section No.s are stored in such form as "V000" or "V1314" as shown in FIG. 7 in correspondence to the suction holes 57.

In the operation of controlling the pick-up control section 16 in the pick-up unit controller 17, the cutting data 63 stored in the storage medium is read into the internal memory in the controller (step S10) to be ready for the generation of the valve control data 64. Further, parts are counted from the cutting data 3 (step S11), and parts No. of parts to be handled are written in the value control data 64 in the storage medium 65 (step S12).

Further, circumscribing rectangles of the parts to be dealt with are calculated (step S13), and candidates of suction holes 57 for the suction are determined from the circumscribing rectangles calculated in the step S13 (step S14). FIG. 6 shows the circumscribing rectangle 67 of the parts 66a. The suction holes 57 within the circumscribing rectangle 67 are candidates of suction holes 57 for suction with respect to the parts 66a. In this case, 35 suction holes 57, i.e., "V0000" to "V0600", "V0001" to "V0601", "V0002" to "V0602", "V0003" to "V0603" and "V0004" to "V0604".

Then, an inclusion check is executed with the suction holes 57 that are determined in the step S14 to be candidates (step S15). The term "inclusion check" means that suction holes 57, that are included in the cutting area of each part are determined among those determined in the step S14 to be candidates. With the parts 66a, 27 suction holes 57 "V0100" to "V0600", "V0001" to "V0601", "V0002" to "V0502", "V0203" to , "V0603" and "V0404" to "V0604" are for suction.

Subsequently, the suction hole Nos. determined in the step S15 are written in the valve control data 64 in the storage medium 65 (step S16), and a check is made as to whether the processes in the steps S12 to S16 with respect to all the parts have been ended (step S17). If the processes are ended, the sequence of operations is ended. If not, the parts to be dealt with are renewed (step S18), and the routine returns to the step S12. This routine is repeated until the processes with respect to all the parts are ended.

Now, the pick-up control operation when picking up parts after the cutting will be described with reference to FIG. 7. Until the pick-up is started under a command from the interlock control section 24, the pick-up unit 15 has been raised by the lift mechanism 52 in the direction of arrow J and moved by the slide mechanism 53 in the direction of arrow K under a command from the feed control section 54 and is waiting.

Now, in the pick-up unit controller 17 the pick-up control section 16 executes the following operation under a command from the interlock control section 24. The pick-up control section 16 makes preparation for the pick-up operation by reading valve control data 64, which has been generated in the steps S10 to S18 and stored in the storage medium 65, into the controller memory (step S20). Then, the feed control section 54 lowers the pick-up unit 15 in the direction of arrow I (step S21). Then, only the suction valves 59 determined for suction are opened to be ready for suction according to the valve control data 64 (step S22). Then, the feed control section 54 raises the pick-Up unit 15 in the direction of arrow J (step S23).

Then, the sensors 58 disposed adjacent the suction holes 57 effect a check as to whether there are parts to be sucked (step S24). Then, from the results obtained in the step S24 a check is made as to whether there is a pick-up fault a deviation of the workpiece is generated on the feed conveyer 7, for example (step S25). If it is determined that there is no pick-up fault, the feed control section 54 moves the pick-up unit 15 in the direction of arrow L and transfers the picked-up parts to the discharging conveyer 18 (step S30). If it is determined that there is a pick-up fault, the pick-up fault site is checked (step S26), the picked-up parts are transferred to the discharging conveyer 18 (step S27), the selected suction valves 59 for the pick-up faulty parts are opened, and then the pick-up operation is executed once again (step S28).

Then, like the step S25 a check is made as to whether there is a pick-up fault (step S29). If it is determined that there is no pick-up fault, the routine goes to the step S30. If it is determined that there is a pick-up fault, a pause is set, and this state is notified to the interlock control section 24. When the operation in the step S30 is ended, the pick-up control section 16 makes a pick-up completion report to the interlock control section 24, thus bringing an end to the sequence of operations.

In this embodiment, a two-axis robot is used as shown in FIG. 1 to permit movement in two directions. In FIG. 1, designated at 55 is a slide mechanism, which can move the ITV camera 9 in horizontal directions (of arrows M and N) with respect to the feed conveyer 7, thus permitting movement in two directions. The position matching control section 11 thus controls the two-axis robot. By permitting the two-direction movement in the automatic operation under control of the interlock control section 24 interlocking the functions of supply of the workpiece 3, position matching, cutting, pick-up, and removal of the cutting remains, it is possible to reduce the number of pauses of the feed conveyer 7 due to position matching and permit the functions of the position matching, cutting and pick-up to be obtained concurrently, thus improving the production efficiency.

Figure 8:
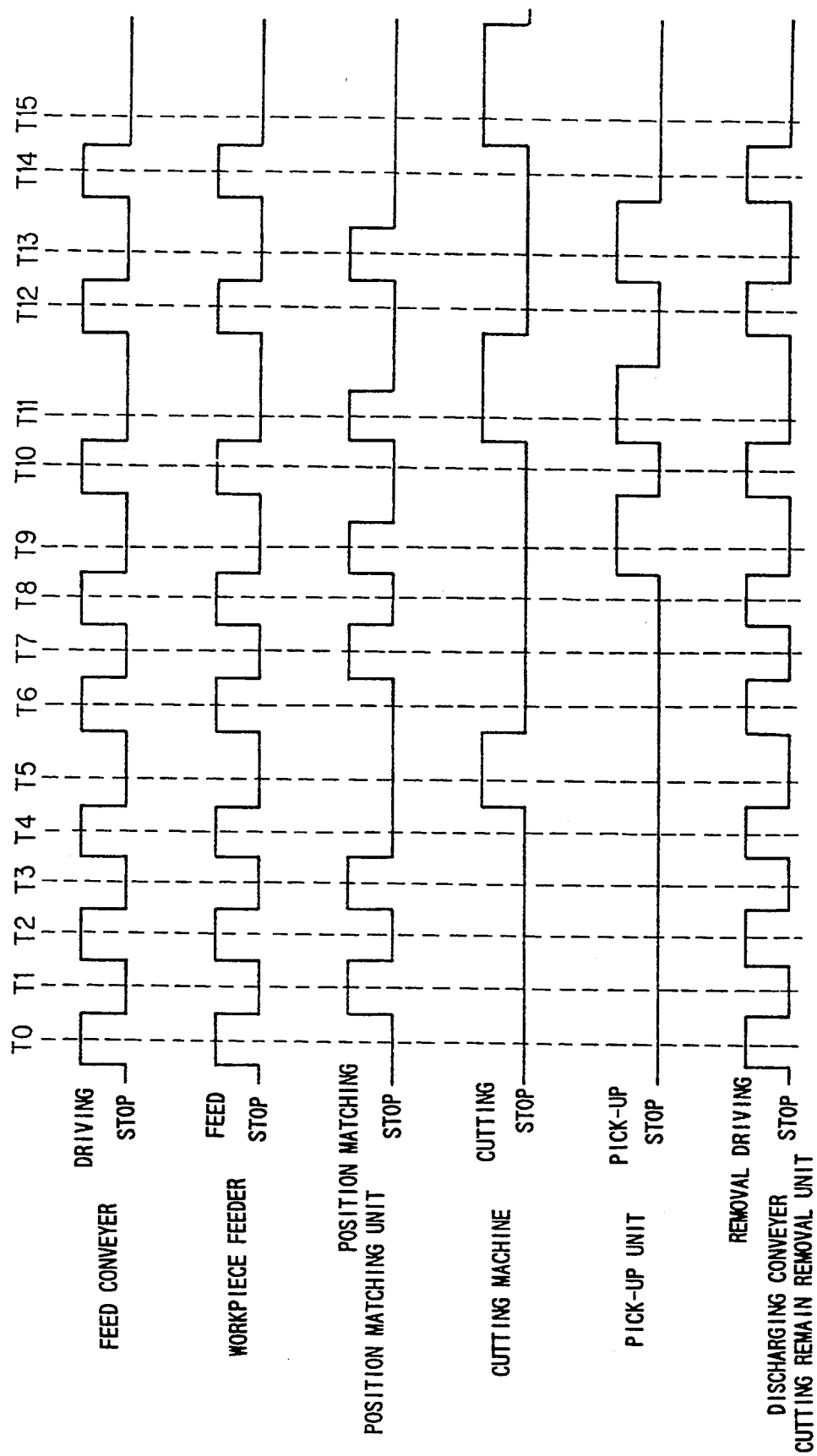
FIG. 8 is a timing chart illustrating timings of the interlock operation in the cutting machine according to the invention.

FIG. 8 is a timing chart showing timings of operations in individual units. In FIGS. 2 and 8, T0 to T15 show states of the individual units and the workpiece at certain instants of time. The workpiece feeder 4 supplies the workpiece 3 in the direction of arrow A in synchronism to the feed conveyer 7. Also, in synchronism to the operation of the feed conveyer 7 the cutting remains removal unit 21 removes cutting remains left on the feed conveyer 7 without being picked up by the pick-up unit 15.

By operating the start switch, the operation is started. The workpiece 3 is fed on the feed conveyer 7 in the direction of arrow A to a position, at which the parts P1 and P2 can be position matched (state T0). In the state T0, the workpiece feeder 4 supplies the workpiece 3 in the direction of arrow A in synchronism to the feed conveyer 7.

The operations of the individual units in the states T1, T3, T5, T9, T11, T13 and T15 are the same as the operations shown in FIG. 3. In the states T2, T4, T6, T8, T10, T12 and T14, the workpiece feeder 4 feeds the workpiece 3 in the direction of arrow A in synchronism to the operation of the feed conveyer 7. Also in synchronism to the feed conveyer 7, the cutting remains removal unit 21 removes cutting remains left on the feed conveyer 7 without being picked up by the pick-up unit 15 in synchronism to the driving of the feed conveyer 7. As noted above, since the supply of the workpiece and removal of the cutting remains are interlocked to the cutting machine, it is possible to improve the productivity and save energy.

Figure 9:
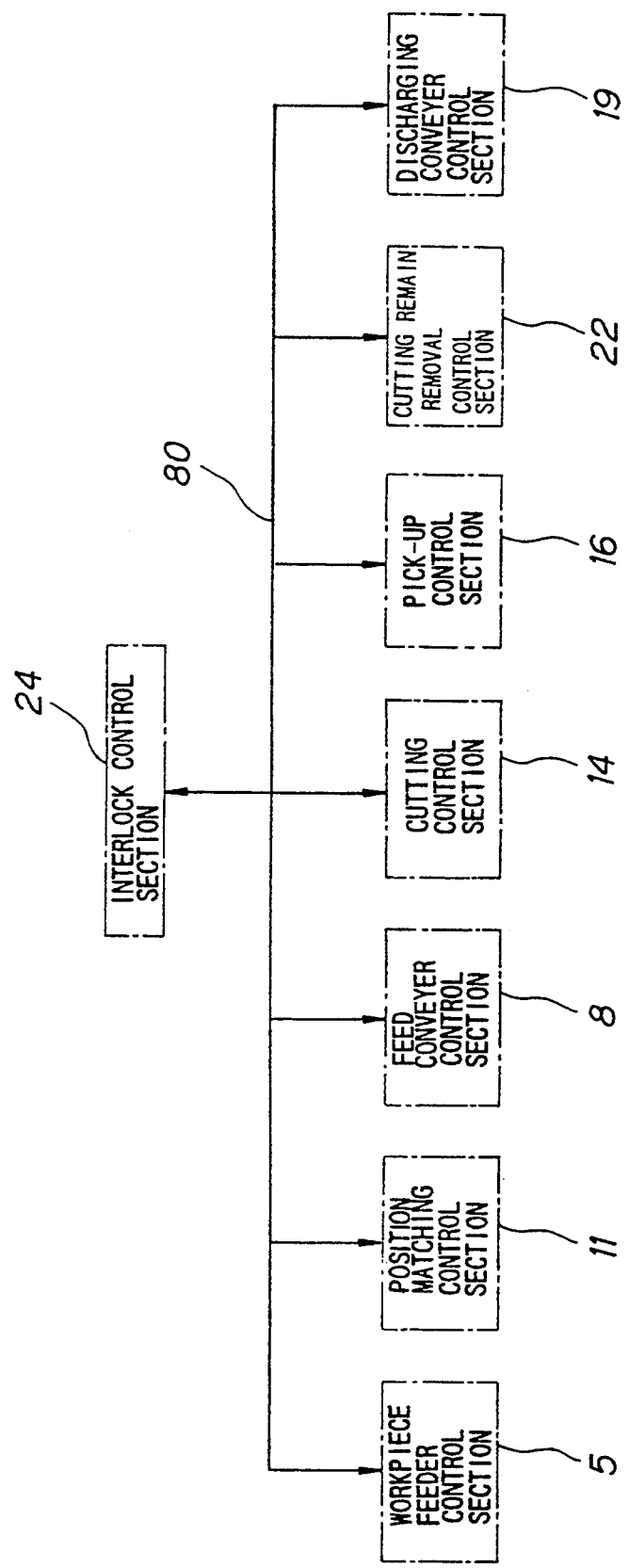
FIG. 9 is a block diagram showing communication means in the cutting machine according to the invention.
Figure 10:
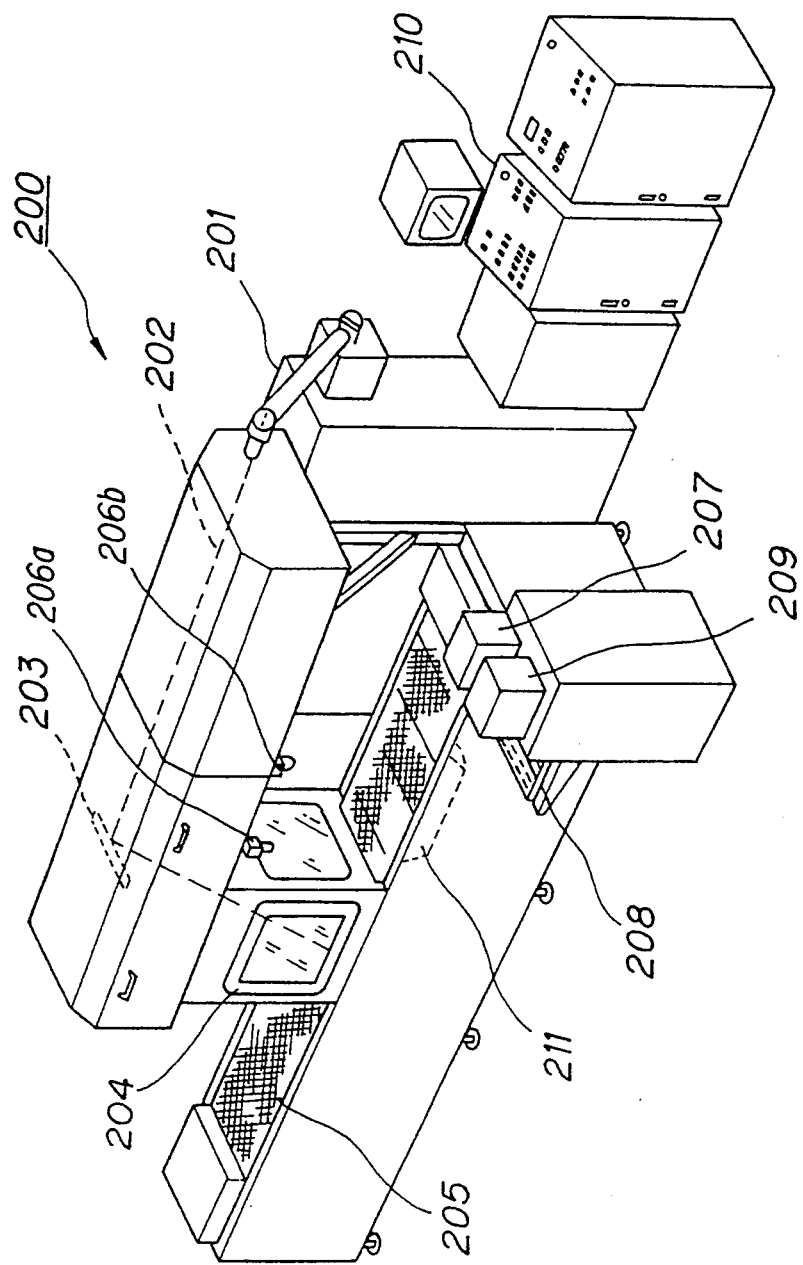
FIG. 10 is a perspective view showing a conventional cutting machine.
Figure 11:
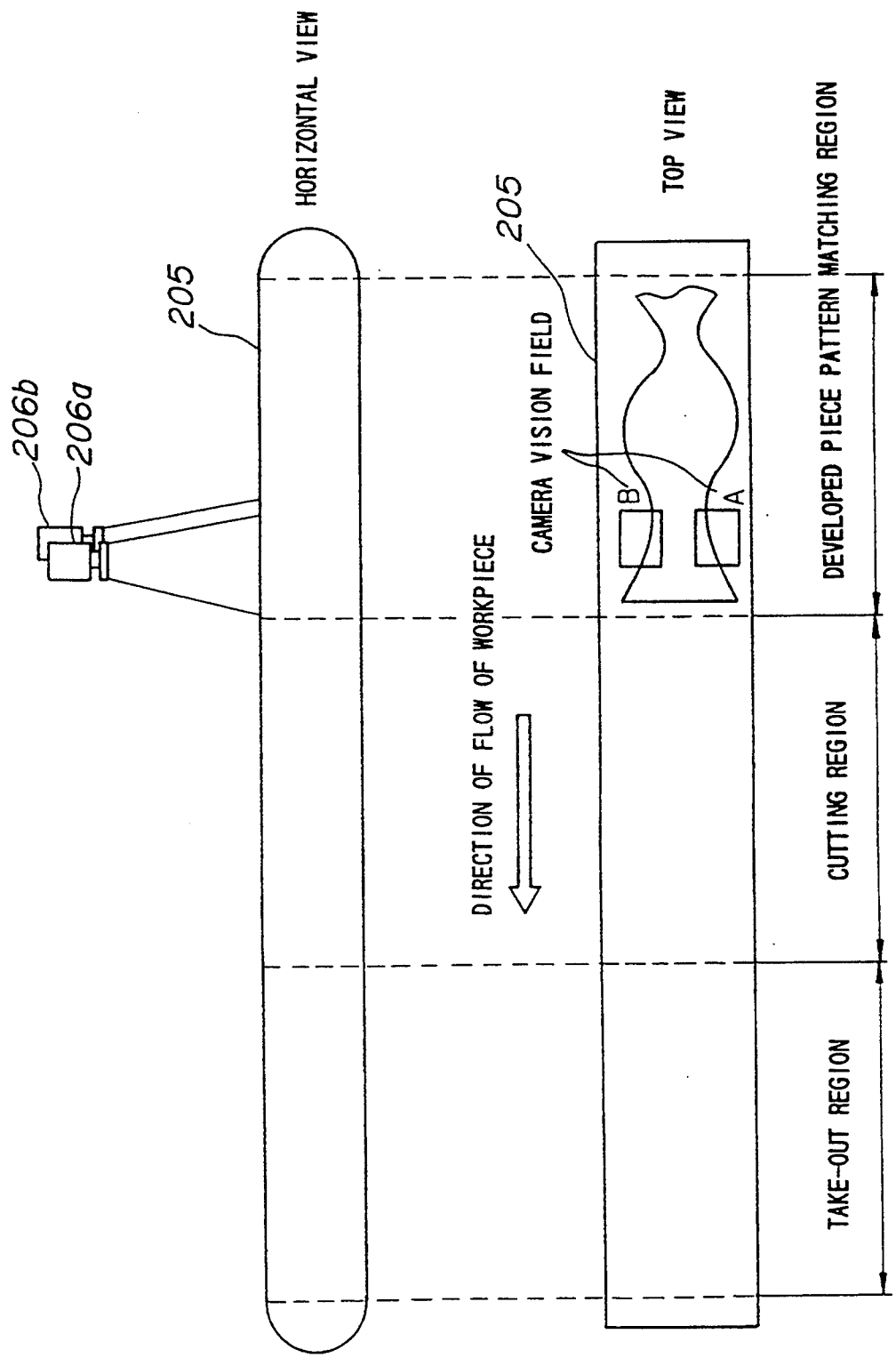
FIG. 11 is a view for explaining the operation of the conventional cutting machine.

FIG. 9 is a lock diagram schematically showing the communication structure the cutting machine according to the invention. Referring to Figure, designated at 80 is a communication unit permitting communication of the individual control sections with one another. The communication unit may utilize serial communication (RS-232C), communication by I/O, local area network (LAN), etc.

As the operation goes from the state T0 to the state T15 in FIGS. 2 and 8, the interlock control section 24 exchanges signals with other control sections by using the communication unit 80 for automatic execution of processes. With the provision of the communication unit 80 permitting communication of the individual control means with one another, it is possible to automatize the operation and improve the productivity.

While the above embodiment used a laser for the cutting purpose, the same effects may be obtained with different cutting systems. Further, while the above embodiment has employed the parts pick-up apparatus of the suction type utilizing air, similar effects are obtainable with other systems, such as an electrostatic system utilizing static electricity, or a system utilizing pins or special adhesives.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cutting machine for cutting a workpiece comprising:
    a feeding means for feeding said workpiece;
    a position detecting means for detecting position of said workpiece fed by said feeding means;
    a deviation amount calculating means for calculating a deviation amount of said workpiece according to positional information detected by said position detecting means;
    a cutting means for cutting said workpiece fed by said feeding means into parts according to said deviation amount calculated by said deviation amount calculating means;
    a pick-up means, comprising a suction system, for picking up parts cut by said cutting means;
    a discharging means for discharging said parts picked up by said pick-up means; and
    an interlock control means for interlock controlling the operation of said plurality of aforementioned means.

2. A cutting machine for cutting a sheet-type workpiece comprising:
    a feeding means for feeding said workpiece;
    a position matching means for effecting position matching of said workpiece fed by said feeding means;
    a position matching correcting means for checking positional deviation of said workpiece and calculating a deviation amount;
    a cutting means for cutting said workpiece fed by said feeding means into parts according to said deviation calculated by said position matching correcting means;
    a pick-up means, comprising a suction system, for selectively picking up parts cut by said cutting means;
    a discharging means for discharging parts picked up by said pick-up means; and
    an interlock control means for interlock controlling the operation of said plurality of aforementioned means.

3. The cutting machine according to claim 1, wherein said pick-up means comprises a plurality of suction holes, a plurality of suction valves respectively controlling said plurality of suction holes independently, and sensing means for sensing parts being picked up in synchronism to suction valve on-off operation and for detecting a fault in said operation.

4. The cutting machine according to claim 2, wherein said pick-up means comprises a plurality of suction holes, a plurality of suction valves respectively controlling said plurality of suction holes independently, and sensing means for sensing parts being picked up in synchronism to suction valve on-off operation and for detecting a fault in said operation.

5. The cutting machine according to claim 3, wherein said suction valves are controlled according to valve control data generated according to cutting data.

6. The cutting machine according to claim 4, wherein said suction valves are controlled according to valve control data generated according to cutting data.

7. The cutting machine according to claim 3, wherein said interlock controlling means causes said pick-up means to reexecute said pickup operation in response to detection of a workpiece pick-up fault by said sensing means by controlling the suction force of the suction valve or valves corresponding to the site of said pick-up fault.

8. The cutting machine according to claim 4, wherein said interlock controlling means causes said pick-up means to reexecute said pickup operation in response to detection of a workpiece pick-up fault by said sensing means by controlling the suction force of the suction valve or valves corresponding to the site of said pick-up fault.

9. The cutting machine according to claim 1, wherein said pick-up means comprises lift means movable in perpendicular directions with respect to said feeding means, slide means movable horizontally relative to said feeding means, and feed control means for feeding picked-up parts to said discharging means by controlling said lift means and said slide means.

10. The cutting machine according to claim 2, wherein said pick-up means comprises lift means movable in a perpendicular direction with respect to the movement direction of said feeding means, slide means movable in said movement direction of said feeding means, and feed control means for feeding pick-up parts to said discharging means by controlling said lift means and said slide means.

11. A sheet-type workpiece cutting and pick-up method for a cutting machine comprising:
    selectively and automatically cutting a workpiece into parts in accordance with shape defining data;
    detecting shapes of said cut parts; and
    picking-up workpiece parts by applying a pick-up force only to areas occupied by said cut shapes.

12. A sheet-type workpiece cutting and pick-up method for a cutting machine comprising:
    reading workpiece cutting data defining at least selective cut part shapes and locations on said workpiece;
    counting the number of parts cut from said workpiece based on said cutting data and generating parts count data;
    generating pick-up control data from said parts count data;
    calculating circumscribing shapes of workpiece parts;
    determining suction hole candidates for suction according to the calculated circumscribing shapes; and
    specifying suction holes by executing an inclusion check.

13. An automated and interlocked sheet-type workpiece cutting and pick-up method for a cutting machine comprising:
    feeding said workpiece;
    detecting the position of said fed workpiece and generating workpiece position information;

calculating a deviation amount of said workpiece according to said detected workpiece position information;

cutting said fed workpiece into a plurality of parts according to said deviation amount;

suction picking up of said plurality of cut parts; and discharging said picked up parts.

14. An automated and interlocked sheet-type workpiece cutting and pick-up method as set forth in claim 13 further comprising:

position matching of said fed workpiece to a reference, checking positional deviation of said workpiece and calculating a deviation amount; and wherein said cutting said workpiece into parts is conducted according to said deviation amount.

15. An automated and interlocked sheet-type workpiece cutting and pick-up method as set forth in claim 13 further comprising:

using a pick up apparatus having a plurality of suction holes and controlling said plurality of suction holes independently; and sensing cut parts being picked up and detecting a fault in said operation.

16. An automated and interlocked sheet-type workpiece cutting and pick-up method as set forth in claim 15 further comprising:

controlling said suction holes according to suction control data generated according to cutting data.

17. An automated and interlocked sheet-type workpiece cutting and pick-up method as set forth in claim 16 further comprising:

interlock controlling said method such that, when a workpiece pick-up fault is detected, said pick-up operation is executed afresh by controlling the suction at holes corresponding to the site of said pick-up fault.

18. The method of claim 11 wherein said pick-up force in said picking-up step is a suction force.

19. A cutting machine for cutting a workpiece comprising:

cutting means for cutting said workpiece into parts according to shape defining data to form cut parts and waste material; and separating means for separating said cut parts and said waste material by selectively applying a pick-up force in a pattern according to shapes of said cut parts.

20. The cutting machine of claim 19 wherein said separating means utilizes suction force.

* * * * *